United States Patent [19]
Ziccarelli

[11] 3,843,808
[45] Oct. 22, 1974

[54] CHEESE CRUMBLES
[75] Inventor: Salvatore F. Ziccarelli, Downers Grove, Ill.
[73] Assignee: Beatrice Foods Co., Chicago, Ill.
[22] Filed: Mar. 6, 1973
[21] Appl. No.: 338,523

[52] U.S. Cl............... 426/187, 426/188, 426/189, 426/358, 426/361
[51] Int. Cl............................................ A23c 19/12
[58] Field of Search.......... 99/117, 118 P, 156, 166, 99/123; 426/36, 187, 188, 356, 361

[56] References Cited
UNITED STATES PATENTS

| | | | |
|---|---|---|---|
| 2,279,202 | 4/1942 | Musher | 99/117 |
| 2,817,590 | 12/1957 | Traisman et al. | 99/117 |
| 2,913,342 | 11/1959 | Cameron et al. | 99/123 |
| 3,121,014 | 2/1964 | Jokay | 99/117 X |
| 3,741,774 | 6/1973 | Burkwall | 99/117 |

Primary Examiner—David M. Naff
Attorney, Agent, or Firm—Cushman, Darby & Cushman

[57] ABSTRACT

A cheese-flavored, shelf-stable and self-preserving composition is disclosed comprising dry cheese solids, finely dispersed fat particles having a melting point of 90°F to 124°F enrobed in a fat enrobing agent which prevents coalescing of the fat particles, and less than 5 percent moisture by weight. The composition is prepared by admixing the dry cheese solids, fat and enrobing agent at a temperature of 34°F to 85°F and continuing mixing until the fat has dispersed into particles having an average particle size of less than about 0.5 millimeter.

16 Claims, No Drawings

CHEESE CRUMBLES

The present invention relates to a cheese flavored composition and method of manufacture thereof, which composition resembles crumbled or bits of natural cheese. More particularly, the invention relates to the aforenoted composition having the important properties of being shelf-stable and self-preserving.

Crumbled natural cheese and natural cheese bits are used with many food compositions and foods, including salad dressings, toppings and sauces for vegetables, meats, poultry, and fish, as well as used as a garnish for various foods. Additionally, crumbled cheese is used in producing a wide range of dips and related snack foods. However, any food composition, such as sauces, dips and garnishings, which has crumbled natural cheese therein is not shelf-stable and must be packaged or otherwise stored in a preserving atmosphere, e.g., sterile packaging, frozen, etc. Since many of the aforenoted food compositions are in the general class of the so-called "convenience food" compositions, it would be, of course, most desirable to incorporate in these convenience food compositions a product which closely resembles crumbled natural cheese in appearance, flavor and mouth feel, but which does not require special packaging or storage conditions.

It is therefore an object of the present invention to provide cheese flavored compositions which closely resemble crumbled or bits of natural cheese in appearance, taste and mouth feel, but which are self-stable at ambient conditions for long periods of time and which are self-preserving. It is a further object to provide a method of manufacture of such compositions as well as food products containing those compositions. Other objects will be apparent from the following disclosure and claims.

Known cheese flavored compositions, of the present nature, contain the essential nutrients for bacterial growth, and those compositions are not self-preserving and shelf-stable in the present manner. Further, such compositions do not always exhibit the properties which are attractive to the consuming public, e.g., consistency and mouth feel similar to crumbled or bits of natural cheese. The present invention differs from these known cheese flavored compositions, briefly in that the compositions are shelf-stable and self-preserving, resemble crumbled or bits of natural cheese in appearance, taste, consistency and mouth feel and comprise dry cheese flavored solids, finely divided fat particles, said fat having a melting point in the range of 90°F to 124°F, and said fat particles being substantially coated with a fat enrobing agent, and the said composition has a moisture content of no more than 5 percent by weight.

The dry cheese flavored solids may be dry natural cheese solids or artificially produced cheese flavored solids or combinations thereof, so long as the solids used have a taste similar to dry natural cheese solids. Thus, for purposes of the present specification, the term "cheese solids" is intended to embrace artificial cheese solids as well as natural cheese solids. The cheese solids must be dry but the particular drying process is not critical so long as relatively low moisture (water) levels are reached, as more fully explained hereinafter. However, conventional spray-drying is most satisfactory in this regard.

The moisture content of the dried cheese solids should be consistent with producing an ultimate composition having a maximum moisture content of 5 percent by weight or less in order to ensure self-preserving properties. However, since other of the ingredients of the present composition often have very low moisture contents, the dry cheese solids may have moisture contents above 5 percent, so long as the combined ingredients making the composition have a total moisture content of 5 percent by weight or less. Thus, the dried cheese solids may have moisture contents of 9 percent or less, e.g., 7 percent or less, but less than 5 percent is preferred.

As noted above, in lieu of dry natural cheese solids, artificial cheese solids may be used in the present composition. U.S. Pat. Nos. 3,674,508 and 3,667,968 disclose artificially produced cheese flavored solids which are particularly useful in this regard. These cheese flavored solids may be described as the product resulting from the drying, especially spray drying, of a pasteurized aqueous growth medium containing the growth products of a symbiotic combination of organisms, wherein the growth medium contains at least one protein and at least one carbohydrate and the symbiotic combination of organisms consists essentially of a non-toxic member of the Genus Bacillus and a non-toxic member of the Genus Streptococcus. Additionally, the product may contain specific cheese flavor organisms for specific natural cheeses to provide additional cheese flavor. The product may also be compounded with natural cheese, as disclosed in the said foregoing patents. The dry artificial cheese solids of those patents, whether or not compounded with natural cheese, are herein referred to as "dry fermented cheese flavored solids." However, the entire disclosure of both U.S. Pat. Nos. 3,674,508 and 3,667,968 are incorporated herein by reference, and relied upon for their entire disclosures. Those dry cheese flavored solids are commercially available under the trademark CHEZ-TONE, manufactured by the Beatrice Foods Co.

The properties of the particular fat used in the present composition are quite critical to the success of the invention. The final composition, of course, must be an apparent solid at room temperature (i.e., not a flowable liquid) but yet must be essentially liquefiable in the mouth, in the manner of natural cheese, in order to provide the correct mouth feel. In natural cheese, this liquification property is provided, at least in part, by the relatively high moisture content of the natural cheese. However, this moisture content makes the cheese not self-preserving. In the present composition, the moisture has been replaced by the fat and, therefore, the fat must have properties which, in the composition, will mimic the moisture content of cheese. On the other hand, the composition must not have a waxy mouth feel, which can result from waxy fats, i.e., fats of too high melting points and like properties. Additionally, a basis of the invention is the discovery that the fats of natural cheese have melting characteristics which provide continued liquification of the natural cheese in the mouth and which cause the familiar succession of cheese flavors and sensations in the mouth. In order to duplicate those sensations with the present composition, it is necessary that the fats have relatively specific melting characteristics.

For the above reasons, the fat must have a melting point (Wiley) of no lower than 90°F and no higher than 124°F. Preferably, however, the melting point will be between about 95°F and 120°F, especially between about 97°F and 110°F. A preferred melting point is between 97°F and 101°F. Additionally, the fat should have a Solid Fat Index (S.F.I.) within the following ranges:

SOLID FAT INDEX

| Fat Composition | Index Temp. Range °F | Unmelted Weight% | |
|---|---|---|---|
| A | 50°F | 72 | |
|   | 70°F | 63 | |
|   | 80°F | 55 | |
|   | 92°F | 25 | |
|   | 100°F | 5 | (max.) |
| B | 50°F | 70 | |
|   | 70°F | 64 | |
|   | 80°F | 50 | |
|   | 92°F | 3.5 | |
|   | 110°F | 0 | |
| C | 50°F | 68 | |
|   | 70°F | 58 | |
|   | 80°F | 52 | |
|   | 92°F | 30 | |
|   | 100°F | 19 | |
|   | 110°F | 12 | |

The S.F.I. of the fat is preferably at least as high as that of composition A, although an S.F.I. as low as that of composition B is permissible. Composition C is the highest permissible S.F.I. Far preferably, however, the S.F.I. of the fat used is between composition B and composition C and more nearly that of composition A. The Solid Fat Index is a standard fat test which is carried out by use of a conventional dilatometer.

It should be appreciated from the above that the particular fat need not be a single fat, and indeed the fat is often a mixture of specific fats. By mixing various specific fats, a melting point and S.F.I. within the above ranges can easily be obtained from commercially available fats. The particular fats are not critical and can be derived from vegetables, such as corn oil, soybean oil, safflower oil and the like, suitably hydrogenated to provide the foregoing properties, and animal fats such as marine fats, rendered animal fat and the like. However, since butterfat is extremely difficult to render self-preserving, even at low moisture concentrations, butterfat per se should be avoided in the composition.

It is necessary that the fat be dispersed in the present composition as finely divided particles. However, if the finely divided particles are subsequently allowed to contact, they will slowly coalesce into larger and larger particles and the composition will, with time, deteriorate at ambient conditions into a greasy consistency, which is, of course, not acceptable. Thus, the fat particles must be prevented from coalescing. While this could be accomplished by good initial mixing which fully separates the fat particles, subsequent handling and use of the composition can easily cause contact of the fat particles and subsequent coalescing thereof. Accordingly, the fat particles should be coated so that even when the particles contact each other, it is a coating-to-coating contact and not a fat-to-fat contact. Any edible material which will coat fat particles and prevent low melting components of the fat from bleeding therethrough may be used, and many such materials are known in the art, e.g., as fat enrobing agents. The enrobing agent, however, must be capable of substantially fully enrobing the fat particles and preventing substantial bleeding of the fat through the enrobing agent.

Thus, the enrobing agent can be any of the conventional food grade fat enrobing agents such as vegetable gums, cereals, starches and flours, dextrin, non-fat milk solids and proteins. For example, gum arabic, gum acacia, carboxymethyl cellulose, sodium caseinate, corn starch, microcrystalline cellulose, soybean protein, gelatin and the like may be used.

However, superior results are obtained when a particular fat enrobing agent is used, and this is the preferred form of the invention. This particular enrobing agent is disclosed in copending application Ser. No. 277,048, filed on Aug. 1, 1972, the entire disclosure of the said application being incorporated herein by reference and the entire disclosure being relied upon. The product disclosed in that said application is defined as a flavor potentiator, but it has now been found that the product also functions as a superior fat enrobing agent in the present composition, as well as a flavor potentiator. The product of that application is produced by heating a mixture of yeast and whey, while in the fluid state, to a temperature at least 140°F and the mixture is allowed to dwell at that temperature. The fluid mixture is then dried, e.g., spray dried. The ratio, on a dry basis of yeast to whey is less than 75:25, preferably less than 50:50 and more preferably less than 25:75. The ratio, however, is at least 2:98. The product can be described as a dry, heat-treated synergistic combination of yeast and whey. Thus, for purposes of the present specification, the terms "dried yeast and whey" are defined to reference the foregoing described product of the said application. This product is commercially available under the trademark FP-37, manufactured by the Beatrice Foods Co.

The proportion of the ingredients can vary widely depending upon the precise consistency, taste and mouth feel desired. Thus, on a weight basis, the fat can be between about 30 percent to 50 percent, especially 35 percent to 45 percent; the dry cheese flavored solids, either dry natural cheese or artificially produced cheese flavored solids, or combinations thereof, as discussed above, can be from 10 percent to 70 percent, especially 40 percent to 60 percent; and the fat enrobing agent can be from 1 percent to 20 percent, especially up to 10 percent.

The composition is prepared by mixing the dry ingredients and then shaping the composition, e.g., by extrusion. The mixing and/or shaping step should disperse the fat in the fat enrobing agent so that fine particles of fat are substantially completely enrobed. The size of the fat particles is not narrowly critical, but it is preferred that the particles be less than 0.5 millimeter, especially less than about 0.1 millimeter and preferably less than 0.05 millimeter. Mixing can be at any desired temperature consistent with accomplishing dispersement of the fat as described, but temperature at about room temperature is preferred. Lower temperatures can be used but the lower temperatures are not required to produce the necessary sizes of fat particles. Thus, temperatures between 34°F and 85°F, especially between 65°F and 80°F can be used, but temperatures between 70° and 75°F are preferred.

After the composition is mixed, it can be formed into desired compressed, molded or extruded shapes by conventional techniques. Additionally, the composition can be rolled into a thin sheet and then flaked by vibrators, brushes, revolving blades and the like into a crumble very much resembling crumbled natural cheese. In this latter method, however, it is preferred that the sheet be made on a non-stick surface such as a lightly greased metal support or a Teflon-coated metal support, preferably the support being cooled. Additionally, to improve crumbling, the compacted and sheet-formed composition can be cooled. Alternately, the composition may be shaped by extruding in a conventional pellet mill, such as a "California" mill, or like device, to produce a desired shape, such as rods, which are then chopped, preferably in irregular lengths, to provide shaped sections resembling crumbled natural cheese. The forming temperatures can be the same as the mixing temperatures, noted above, but it is preferred that the higher part of that range be used, e.g., between 70°F and 85°F, especially between 75°F and 80°F.

The cheese solids utilized may be any of the conventional natural cheese solids or artificially produced solids as noted above. Thus, the cheese solids may be cheddar cheese, bleu cheese, Romano cheese, Swiss cheese, Parmesan cheese, Italian cheese, Limburger cheese, cream cheese, Baker's cheese, Roquefort cheese, Mozzarella cheese, etc.

The composition, as is conventional in the art, may include coloring agents, such as USDA Yellow No. 5, additional preservatives such as BHT, propyl galate, BHA and mixtures thereof, salt and flavoring spices such as peppers, caraway seeds, parsely, onion, garlic, etc., as well as any other flavoring elements. These flavoring elements and colors may be used according to taste or convention, all of which is well known in the art.

The composition of the present invention may be added to salad dressings, snack dips, dry toppings, sauces, and the like. The composition has a special advantage in that it may be added to a dry composition and will remain shelf-stable and self-preserving for extended lengths of time. Accordingly, the dry ingredients of a salad dressing can be packaged in a conventional foil or plastic pouch, including the present composition, and the contents of that package can simply be placed in salad oil and/or vinegar for producing a "convenience" salad dressing. The product can also be included in dry food compositions such as snack crackers and like foods, dry animal foods, etc. Additionally, the product can be used by simply sprinkling on prepared foods such as hamburgers, hot dogs, spaghetti and the like, or used in cooking in the same manner as natural cheese. The product, indeed, can be used in any way that natural cheese is used, but additionally has the advantage of use where the product must be shelf-stable and self-preserving, e.g., at least up to one month and generally longer than six months or even a year or two years or more, depending on the particular composition. Of course, the proportion of the present product with other ingredients of the food composition will be according to taste.

The invention will be illustrated by way of the following examples, but it is to be understood that the invention is not limited thereto but is fully applicable to the extent of the foregoing disclosure. In the examples, as elsewhere in this specification, all percentages are by weight unless otherwise indicated.

EXAMPLE 1

50 parts of dry natural cheddar cheese powder, 10 parts of dry yeast and whey (trademark FP-37 manufactured by Beatrice Foods Co.) and 40 parts of 97° to 1.1°F melt fat (trademark Kaomel, manufactured by the Durkee Food Co.) were added to a blender and thoroughly mixed at room temperature. The mixture was then placed in a California pellet mill and pelletized at a temperature of about 75° to 80°F, which temperature was generated in the composition by the mechanical energy of mixing and extruding. The extruded rods were cut to irregular lengths having a major width of about 1/8th inch and a maximum length of about 1/4 inch, although the length was random.

A portion of the product was set aside for shelf-stability tests at ambient conditions and after seven months no deterioration of the product was evident. Another portion of the product was stored at a temperature of 110°F for 10 days in an accelerated shelf-life test and no substantial deterioration of the product was observed. The product was then placed in a water-tight container and partially immersed in a water bath maintained at 140°F for a severe accelerated test. The product remained essentially solid for 8 hours. Another portion of the product was placed in the refrigerator and allowed to come to a temperature of approximately 45°F. The product was still most palatable and had not become hard or otherwise unlike refrigerated natural cheese. Another portion of the product was placed on hamburgers and the temperature was slowly raised until the product began to melt in the manner of natural cheese. The temperature required for satisfactory melting was 170°F, which is consistent with melting temperatures of good quality cheese.

Another portion of the product was placed in a conventional Italian salad dressing and it remained in solid suspended form without deterioration of the product and produced a cheese-flavored Italian dressing.

EXAMPLE 2

Example 1 was repeated except that one-half of the weight of the dry natural cheddar cheese powder was replaced with dry fermented cheese flavored solids (CHEZ-TONE 101, manufactured by Beatrice Foods Co.). The only discernible difference between the product of Example 1 and the product of this example was that the melting point of the product was increased by several degrees. Otherwise, the product was essentially the same as Example 1.

EXAMPLE 3

Example 1 was repeated except all of the dry natural cheese powder was totally replaced with bleu cheese flavored dry fermented cheese flavored solids (CHEZ-TONE 200, manufactured by the Beatrice Foods Co.). Aside from the bleu cheese taste, the product was the same as Example 1, with the further exception that the melting points of the product had increased about 5°F.

EXAMPLE 4

Example 2 was repeated except that the dry fermented cheese flavored solids used were, serially, CHEZ-TONE 300, CHEZ-TONE 400, CHEZ-TONE 500, CHEZ-TONE 600, CHEZ-TONE 700 and CHEZ-TONE 900, which are, respectively, parmesan cheese flavored, Romano cheese flavored, cream cheese flavored, Baker's cheese flavored, Swiss cheese flavored and Mozzarella cheese flavored. Each of the resulting products were essentially the same as that of Example 2 except for higher melting points and, of course, different flavors.

It should also be fully understood that flavors in addition to the cheese flavors can be used in connection with the present invention. Accordingly, a portion of the cheese flavored solids or all of the cheese flavored solids could be substituted with dry fruit flavored solids, such as banana powder, and otherwise the composition manufactured and used as above. This will provide an additional desired flavor component for some uses. Indeed, for certain applications, all of the cheese flavored solids could be replaced by dry fruit flavored solids, such as banana powder, to make a fruit flavored crumble or bit instead of a cheese flavored crumble or bit.

EXAMPLE 5

This example will illustrate the use of dry fruit flavored solids. 45 parts of dry raspberry powder (Beatrene 3114, manufactured by the Beatrice Foods Co., which is spray dried raspberry juice and essences on dextrin or gum arabic carrier), 35 parts 97° to 101°F melt fat (Kaomel), 19 parts of wheat flour (as enrobing agent) and 1 part natural and/or artificial flavors were blended and shaped in the same manner as Example 1. The fruit crumble or bit produced had the appearance, taste, consistency and mouth feel of dried fruit bits. The fruit bits were mixed with a conventionally prepared pancake mix to produce raspberry pancakes.

What is claimed is:

1. A cheese-flavored, shelf-stable and self-preserving composition comprising 10 percent to 70 percent dry cheese solids and from 30 percent to 50 percent of finely divided fat particles having an average particle size of not greater than about 0.5 millimeter, said fat having a melting point in the range of from 90°F. to 125°F. and said fat particles being substantially coated with a fat enrobing agent which prevents coalescing of the fat particles by preventing fat to fat contact of the fat particles wherein the enrobing agent constitutes from 1 percent to 20 percent of the composition, and said composition has a moisture content of no more than 5 percent by weight.

2. The composition of claim 1 wherein the enrobing agent is codried dried yeast and whey wherein the ratio of yeast to whey is from 75:25 to 2:98.

3. The composition of claim 1 wherein the dry cheese solids are at least in part natural cheese solids and in part artificial cheese solids.

4. The composition of claim 3 wherein at least a part of the cheese solids are dry fermented cheese flavored solids and at least a part of the fat enrobing agent is dried yeast and whey.

5. The composition of claim 4 wherein the enrobing agent is essentially only the dried yeast and whey.

6. The composition of claim 4 wherein the cheese solids are totally dry fermented cheese flavored solids.

7. The composition of claim 1 wherein the melting point of the fat is at least 95°F.

8. The composition of claim 7 wherein the melting point is no greater than 120°F.

9. The composition of claim 8 wherein the melting point of the fat is between 97°F and 101°F.

10. The composition of claim 1 admixed with a food product.

11. The method of producing the composition of claim 1 comprising admixing at a temperature between 34°F. and 85°F. said 10 percent to 70 percent dry cheese solids, said 1 percent to 20 percent fat enrobing agent and said 30 percent to 50 percent fat having a melting point in the range of from about 90°F. to 124°F. and continuing the mixing until the fat has dispersed into particles having an average particle size of not greater than 0.5 millimeter and has been substantially enrobed by the enrobing agent, and wherein the resulting mixture has a moisture content of no more than 5 percent by weight.

12. The method of claim 11 wherein the average particle size is less than 0.1 millimeter.

13. The method of claim 11 wherein the mixture is formed into a compressed, molded or extruded shape.

14. The method of claim 13 wherein an extruded shape is produced.

15. The method of claim 13 wherein a compressed sheet is produced and the sheet is randomly flaked into a crumble appearing solid.

16. The method of claim 11 wherein the mixing is carried out at a temperature between 70°F and 85°F.

* * * * *